HAGGARD & BULL.
Harvester.
No. 13,933.        Patented Dec. 11, 1855.
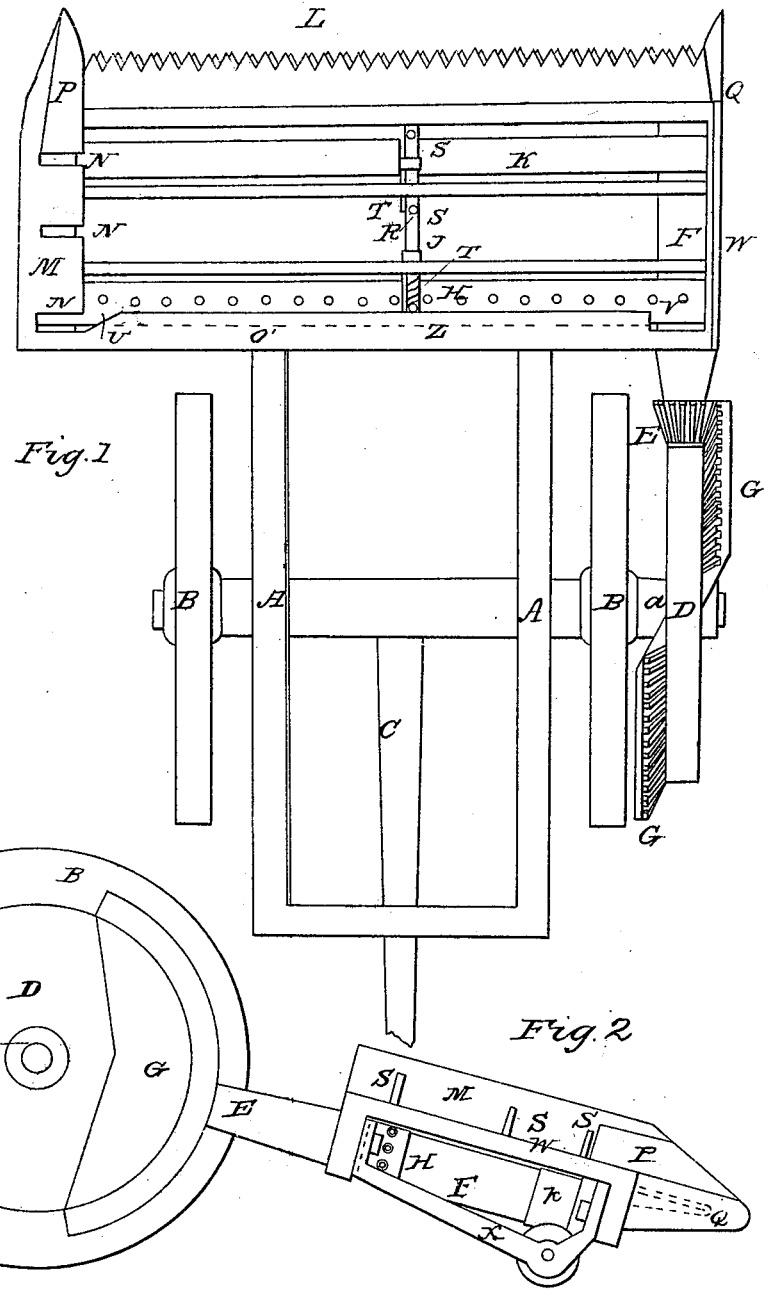

UNITED STATES PATENT OFFICE.

J. W. HAGGARD AND GEO. BULL, OF BLOOMINGTON, ILLINOIS, ASSIGNORS TO BULL, HAGGARD & NEWSTETER.

IMPROVEMENT IN HARVESTER-RAKES.

Specification forming part of Letters Patent No. 13,933, dated December 11, 1855.

*To all whom it may concern:*

Be it known that we, JOHN W. HAGGARD and GEORGE BULL, of the city of Bloomington, and State of Illinois, have invented a new and Improved Mode of Constructing Reaping-Machines; and we do hereby declare that the following description, illustrated by the accompanying drawings and references, is sufficiently clear and comprehensive to enable others of competent skill to make and use our invention.

The nature of our improvement consists in so arranging and constructing the parts hereinafter described for collecting the falling grain that with the utmost simplicity and ease the bundles may be collected and deposited in sheaves suitable for binding. By the simple operation for performing this purpose we are enabled to present the cheapest and most reliable self-raking reaper ever offered to the public.

Figure 1 is a plan of the reaper, and Fig. 2 is a side elevation with certain parts of the machinery which are unnecessary to explain our improvement omitted. This rake is better adapted to square or front-draft reapers than to side ones.

A is the frame which supports the cutters and the grain rack or platform.

B are the traction-wheels driven by the tongue C.

D is a wheel upon the axle *a*, with wings upon either side, upon which bevel cog-gearing is made, as represented at G. The cogs of each of these wings alternately catch the cog-wheel E, giving it a reverse motion at the very point desired. The wheel E is upon the shaft F, over which the leather belts or chains H and K are passed, which also extend over a roller immediately beneath the guide M at the opposite end of the grain-platform. Pins upon the shaft F pass through openings in the belts or chains H to prevent their slipping upon the shaft, thus insuring the uniform motion of the belts and the rollers or shafts over which they pass.

O′ O O and W is the frame that supports the falling grain, and also supports the grain-guides Q P M and the cutters L, the arrangement for operating which is not represented. The plate T is attached firmly to each belt, and the bar J slides in open brackets upon the top of this plate, and together with the pins S S Z form the rake to collect the grain. R prevents it (J) from performing but a part of a revolution, and I is a spring which presses the bar J into the slot V, so that when the belts are reversed in motion the pin Z, which has an upright position in the drawings, is brought under the edge of the frame-plate O′ at V, thus giving to J a part of a revolution, so as to incline the rake-teeth S, &c., to nearly a horizontal position until the belts have passed to the end of the opposite stroke at U, when, by means of the spring I or a balance upon the rake-head, it resumes its natural position for catching the grain. The pins or teeth S S pass into the slots N N, so as not to catch the grain when they rise. While coming to this position of the belts the falling grain upon the open platform has accumulated sufficiently for a sheaf, and on the return of the belts the pin Z slides up the inclined plane U, and the pin R strikes the plate T, keeping the teeth in an upright position until the end of the stroke, when the bundle will be deposited by the side of the frame at W, or upon a platform provided for that purpose.

What we claim as our invention, and desire to secure by Letters Patent, is—

The plate O′, having its inclined and parallel planes on the same sides, in combination with the pin Z, bar J, spring I, and pin R, the whole being constructed, arranged, and operating as described.

JOHN W. HAGGARD.
GEORGE BULL.

Witnesses:
E. R. ROE,
A. W. ROGERS.